(12) United States Patent
Weir

(10) Patent No.: US 7,326,428 B2
(45) Date of Patent: Feb. 5, 2008

(54) MULTI-COMPARTMENT CONTAINER AND LID ASSEMBLY

(75) Inventor: Marjorie Weir, Afton, MN (US)

(73) Assignee: Evergreen Innovation Partners I, LP, Evergreen, CO (US)

(*) Notice: Subject to any disclaimer, the term of this patent is extended or adjusted under 35 U.S.C. 154(b) by 108 days.

(21) Appl. No.: 10/741,285

(22) Filed: Dec. 18, 2003

(65) Prior Publication Data

US 2004/0129707 A1    Jul. 8, 2004

Related U.S. Application Data

(60) Provisional application No. 60/434,743, filed on Dec. 18, 2002.

(51) Int. Cl.
*A23L 1/00*    (2006.01)

(52) U.S. Cl. ............... 426/120; 220/23.88; 220/23.89; 426/119

(58) Field of Classification Search ............ 426/106, 426/108, 119, 120, 124, 112; 206/499, 558, 206/541, 545; 220/23.83, 23.88, 23.89, 526, 220/528
See application file for complete search history.

(56) References Cited

U.S. PATENT DOCUMENTS

| | | | | |
|---|---|---|---|---|
| 1,349,527 A | * | 8/1920 | Owen | 312/216 |
| 2,614,399 A | * | 10/1952 | Roethel | 249/120 |
| 2,944,694 A | * | 7/1960 | Kinsey | 206/541 |
| 3,498,494 A | * | 3/1970 | Voorhees, Jr. | 206/501 |
| 3,855,912 A | | 12/1974 | Schoonmaker et al. | |
| 3,918,357 A | | 11/1975 | Tempero | |
| 3,938,688 A | * | 2/1976 | Ryan | 220/23.8 |
| 3,971,629 A | | 7/1976 | Buix et al. | |
| 4,013,869 A | | 3/1977 | Orts | |
| 4,038,937 A | * | 8/1977 | Moe | 116/308 |
| 4,066,401 A | | 1/1978 | Solomon | |
| 4,179,985 A | | 12/1979 | Baker et al. | |
| D262,839 S | * | 2/1982 | Daenen et al. | D3/302 |
| D264,810 S | * | 6/1982 | Voltmann | D3/203.3 |
| 4,417,509 A | | 11/1983 | Deibel et al. | |
| 4,735,318 A | * | 4/1988 | Keffeler | 206/532 |
| D302,904 S | * | 8/1989 | Dunkfeld, Jr. | D7/709 |
| 5,027,972 A | * | 7/1991 | Bartholomew | 220/526 |
| 5,215,004 A | | 6/1993 | Su | |
| 5,240,113 A | * | 8/1993 | Gibilisco | 206/534 |
| 5,267,650 A | * | 12/1993 | Gilbilisco | 206/534 |
| 5,295,475 A | * | 3/1994 | Kaneko | 126/263.01 |
| 5,322,520 A | | 6/1994 | Milder | |
| 5,344,024 A | * | 9/1994 | Cohu | 206/526 |
| 5,366,069 A | * | 11/1994 | Seidner | 206/0.84 |
| 5,866,181 A | | 2/1999 | Hill | |
| 6,173,839 B1 | * | 1/2001 | Dieter et al. | 206/542 |
| 6,287,484 B1 | | 9/2001 | Hausslein et al. | |
| 6,352,170 B1 | | 3/2002 | Brown et al. | |
| 6,378,325 B1 | | 4/2002 | Yang | |
| 6,412,637 B1 | | 7/2002 | Saunders et al. | |
| 6,653,602 B2 | * | 11/2003 | Li | 219/432 |

* cited by examiner

*Primary Examiner*—Timothy F. Simone
(74) *Attorney, Agent, or Firm*—Perkins Coie LLP

(57) ABSTRACT

A divided container system comprising a master tray having an interior portion and a peripheral top edge, at least one insertable sub-tray positionable within the interior portion of the master tray, wherein each sub-tray includes a peripheral top edge and an interior portion, and a lid for sealing both the master tray and the at least one insertable sub-tray. The lid comprises an upper surface, a lower surface, a plurality of sealing surfaces extending from the lower surface of the lid, wherein the sealing surfaces are arranged to abut with the peripheral top edge of the at least one insertable sub-tray to thereby seal the interior portion of the at least one insertable sub-tray from the interior portion of the master tray, and a peripheral sealing surface for sealable contact with the peripheral top edge of the master tray.

24 Claims, 7 Drawing Sheets

MULTI-COMPARTMENT CONTAINER AND LID ASSEMBLY

CROSS-REFERENCE TO RELATED APPLICATION

The present non-provisional Application claims the benefit of commonly assigned provisional Application having Ser. No. 60/434,743, filed on Dec. 18, 2002, and entitled COMPARTMENTALIZED FOOD STORAGE CONTAINER, which Application is incorporated herein by reference in its entirety.

FIELD OF THE INVENTION

The present invention relates generally to a container for holding at least one item, and more particularly, to a compartmentalized container particularly adapted for storing multiple items separated from each other within a single container for storage and transportation thereof, such as fresh sandwich and salad ingredients.

BACKGROUND OF THE INVENTION

Restaurants, typically of the take-out variety, such as those involved mostly with sandwich and salad preparations, have developed methods of storing ingredients required to prepare sandwiches and salads to an individual order. Special tray arrangements contain the precut ingredients, typically in large quantities, readily available for use. Similarly, many supermarkets have point-of-sales storage and display arrangements for volume sales of such precut ingredients. A storage system for sandwich and salad ingredients in the home would be highly desirable. The home situation differs from that in a restaurant or supermarket. For example, in a restaurant or supermarket, volume sales may require frequent replenishment of ingredients, and food and health laws may deter storage of ingredients from one day to the next. In the home, such ingredients are need only at certain times, and the consumer may want to retain ingredients for longer periods.

The home environment is one area in which it is desirable to provide suitable sandwich and salad ingredient storage. For instance, collecting individual sandwich and salad ingredients from various parts of the refrigerator requires leaving the refrigerator door open for an extended time while searching for the multiple items. It would thus be desirable to provide a single storage unit for containing the needed ingredients so that such a storage unit containing multiple items can be withdrawn from the refrigerator at a single time. A home storage system for a plurality of items, such as sandwich or salad ingredients, may desirably be compartmentalized to hold smaller quantities, maintain freshness and meet the storage requirements of different ingredients. In particular, it would be desirable to have a flexible system that can accommodate multiple containers of various sizes. A compartmentalized storage system should be easily stored in a home refrigerator, be space-efficient, and have other desirable features as described below.

SUMMARY OF THE INVENTION

In accordance with the present invention, a storage and display compartmentalized tray system is provided to allow for effective separation of ingredients included within a single tray, such as would be particularly advantageous for strong flavored ingredients (e.g., onions, peppers, olives, etc.) and for ingredients having different storage requirements (e.g., juicy tomatoes vs. moisture-sensitive lettuce). Such a tray system is desirably designed and manufactured to retain ingredient freshness and eye-appeal for extended time periods. In addition, the tray system of the present invention advantageously provides for convenient and safe transport of the ingredients without refrigeration, such as for meals away from home or for outdoor activities. The storage system includes optional features to aid in maintaining the contents of the container at an acceptable low temperature for an extended period.

The container is especially suitable for individual consumer use, although it is also useful for more commercial applications. The container includes a master tray with a selection of sub-trays designed and adapted to nest adjacent to one another within the master tray. Each sub-tray can retain a separate food item, such as a sandwich or salad ingredient, for example. The sub-trays can have various features to maintain separation and freshness according to the requirements of each food item. Optimally, the sub-trays together completely occupy the master tray. Less than complete occupancy of the master tray is possible, according to the needs of specific ingredients or specific occasions. A lid for the compartmentalized container is preferably constructed and designed so that the lid seals both the individual sub-trays and the master tray.

In one aspect of this invention, a divided container system is provided, comprising a master tray having an interior portion and a peripheral top edge, at least one insertable sub-tray positionable within the interior portion of the master tray, wherein each sub-tray includes a peripheral top edge and an interior portion, and a lid for sealing both the master tray and any insertable sub-trays. In this embodiment, the lid comprises an upper surface, a lower surface, a plurality of sealing surfaces extending from the lower surface of the lid that are arranged to abut with the peripheral top edge of the at least one insertable sub-tray to thereby seal the interior portion of the insertable sub-trays from the interior portion of the master tray, and a peripheral sealing surface for sealable contact with the peripheral top edge of the master tray.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE PREFERRED EMBODIMENTS

Figure 1:
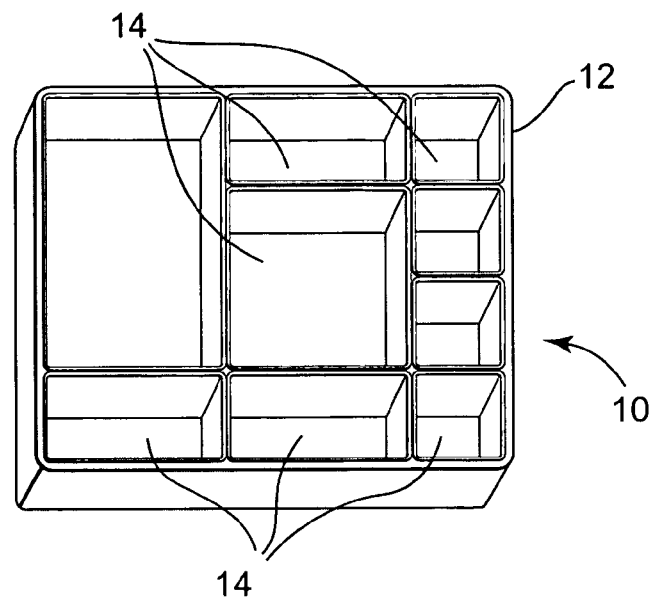
FIG. 1 is a top perspective view of a master tray of the present invention, illustrating one possible array of various sized sub-trays that substantially fill the master tray.
Figure 5:
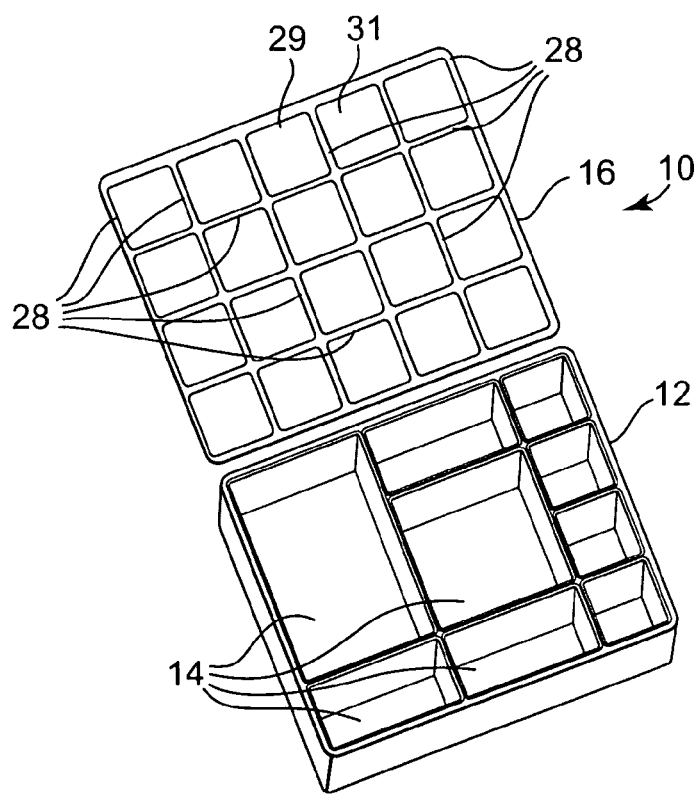
FIG. 5 is a perspective view of the tray system of FIG. 1 including a lid constructed for sealing engagement with both the master tray and the individual sub-trays.
Figure 14:
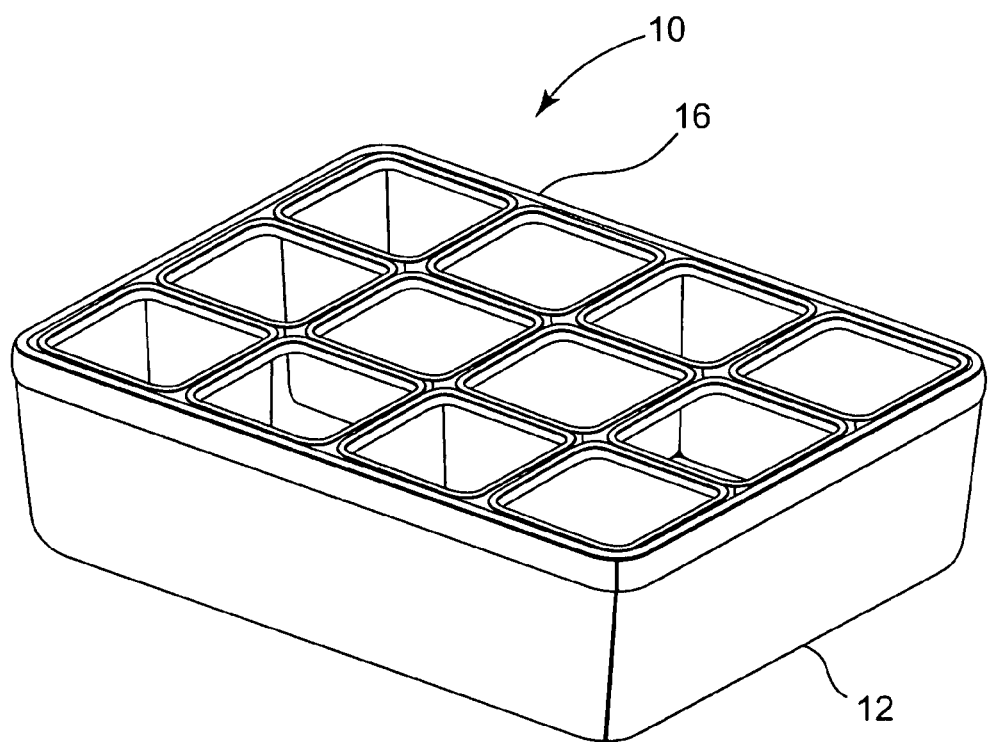
FIG. 14 is a perspective view of a tray system including a master tray holding sub-trays and a lid covering the master tray and sub-trays.

Referring now to the Figures, wherein the components are labeled with like numerals throughout the several Figures, and initially to FIGS. 1 and 5, one embodiment of a compartmentalized tray system 10 of the present invention is illustrated. Tray system 10 generally includes a master tray 12, plural separate insertable or permanently attached sub-trays 14, and a lid 16 (see FIG. 5), which may be completely separable from the master tray 12, or may be connected to the master tray 12 via a hinged connection, for example. In particular, to master tray 12 preferably has dimensions that allow it to accommodate individual insertable and removable sub-trays 14 of various sizes. In addition, the sub-trays 14 are preferably sized to be placed adjacent to each other within the master tray 12 to "fill" the interior portion of the master tray 12 (i.e., to maximize the amount of the internal volume of the container that is occupied by sub-trays 14). For example, FIGS. 1 and 5 illustrate a tray system 10 that includes nine sub-trays 14 of various sizes that are selected and arranged to substantially fill the interior portion of the master tray 12. However, it is contemplated that the interior portion of the master tray 12 is only partially occupied by sub-trays 14, as will be discussed in further detail below. Further, FIG. 14 illustrates another embodiment of a tray system 10, with a variety of differently sized sub-trays being held therein and a lid 16 positioned on top of the master tray 12.

The dimensions of the master tray 12 and sub-trays 14 relative to each other are preferably chosen to allow a selection of sub-trays 14 to occupy the interior of the master tray 12 completely (or substantially completely), when desired. For one example, a master tray 12 may have dimensions of "5y" in length and "4y" in width, where "y" represents one side of the smallest sub-tray 14 that would typically be used in a particular tray system. Referring again to FIG. 5, the lid 16 shows such an arrangement, with five grid sections in the direction of the length, and four grid sections in the direction of the width. In this example, a master tray 12 could accommodate sub-trays 14 whose individual length and width dimensions are multiples of "y".

If, for instance "y" is 3 inches (7.62 cm), the master tray 12 could have a width of 12 inches (30.48 cm) and a length of 15 inches (38.10 cm), providing for sub-trays 14 having length and width dimensions that are multiples of 3 inches (7.62 cm) in order to occupy the total interior area of the master tray 12. The multiplier (i.e., "y" in the above example) may be the same in both the length and width dimensions to provide the maximum flexibility for arranging sub-trays 14 within a master tray 12, since the sub-trays 14 can be oriented in either direction. Alternatively, the multiplier in the length dimension may be different than the multiplier in the width dimension, which may require additional user manipulation and positioning to optimally arrange sub-trays 14 within a master tray 12, since the sub-trays 14 may fit together better when oriented in one particular way relative to the master tray 12.

Figure 3:
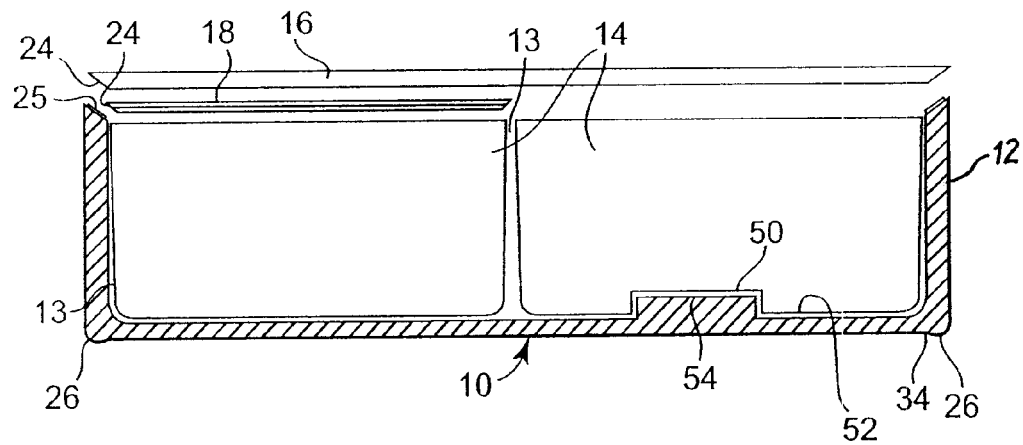
FIG. 3 is a cross-sectional exploded view of a master tray of the type shown in FIG. 1, illustrating the interior portion having two sub-trays, an individual lid for the left-hand sub-tray, and an overall lid suspended in position to lower into sealing arrangement with the master tray and sub-trays.

As can be seen best in FIG. 3, the sub-trays 14 may be made to be at least slightly smaller in at least one dimension than the dimensions that would be needed to completely fill a master tray 12 with adjacent sub-trays. In this way, a small clearance space 13 can be provided between adjacent sub-trays 14 and/or between sub-trays 14 and the side of the master tray 12 so that individual sub-trays 14 may be inserted into and removed from the master tray 12 more easily than if no such clearance space is provided between adjacent sub-trays 14. However, no clearance space or gap 13 necessarily needs to be provided between adjacent tray walls.

One example of a master tray 12 can be about 2 inches (5.08 cm) to about 4 four inches (10.16 cm) deep, with sub-trays 14 of a slightly smaller depth to allow for easier insertion and removal, depending on the construction materials. It is understood that it may be preferable in some situations for the depth of the sub-trays 14 to match or closely match the depth of the master tray 12 in order to maximize the volume of materials that can be held within each sub-tray 14 and to allow for easier sealing to a lid 16, as will be described below. However, the sub-trays 14 may instead have a depth that is slightly or substantially less than that of the master tray 12, which would require a lid that has a recessed portion to reach the upper surfaces of the sub-trays 14, as will also be described in further detail below.

Figure 12:
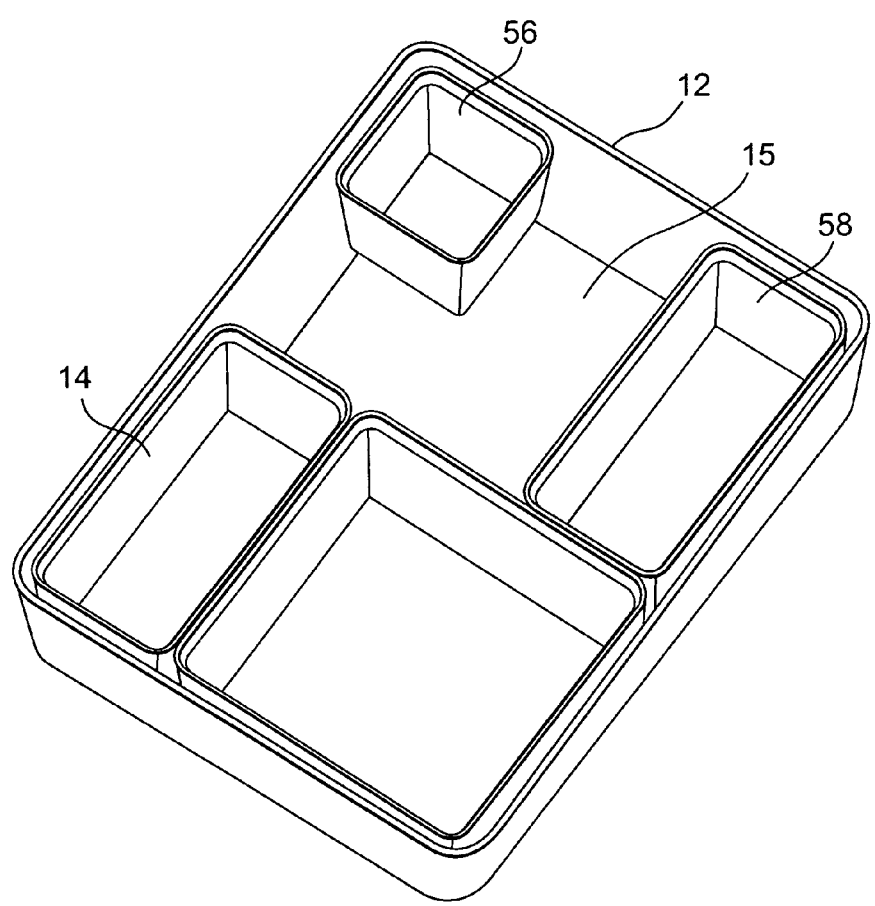
FIG. 12 is a top perspective view of another arrangement of sub-trays within a master tray, in accordance with the present invention.
Figure 13:
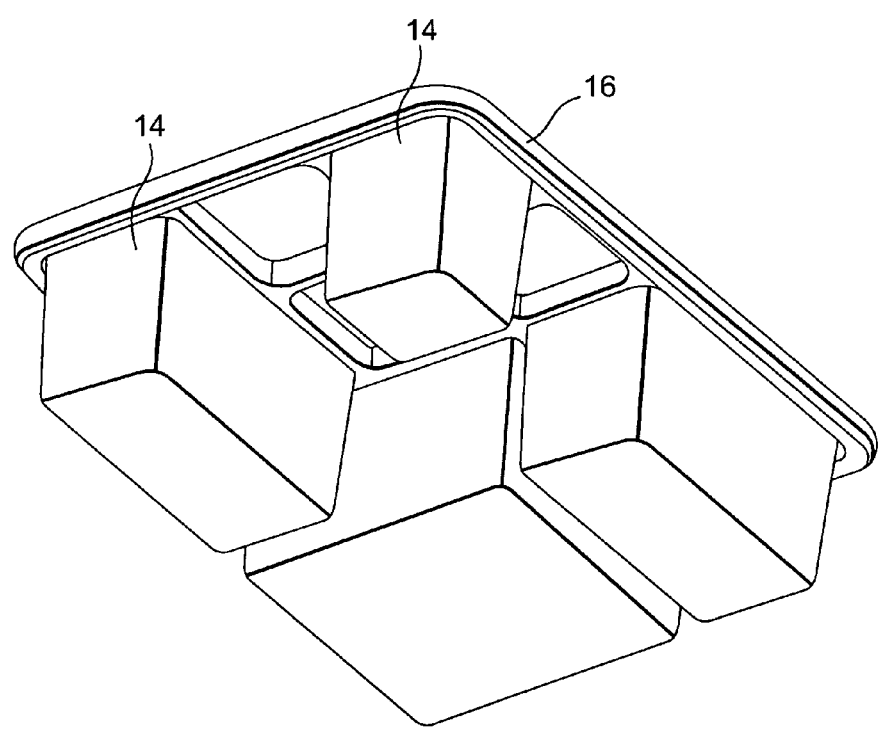
FIG. 13 is a bottom perspective view of the arrangement of sub-trays shown in FIG. 12 with the master tray removed, and including a lid positioned relative to the sub-trays in the same manner the lid could be positioned on the master tray of FIG. 12.

An assortment of differently sized and shaped sub-trays 14 can be made available to fit in various combinations within the master tray 12. Thus, the master tray 12 can be adapted for use with a small number of sub-trays 14 (e.g., two or even one sub-tray positioned therein, where such sub-trays can be relatively large) or a larger number of sub-trays 14 (e.g., twenty sub-trays positioned therein, where such sub-trays are relatively small). While an optimal arrangement of sub-trays 14 would fill the master tray 12 completely, a less than optimal arrangement can be used, and is contemplated as included within the scope of the present invention. One example of such an arrangement is illustrated in FIGS. 12 and 13, where various sub-trays 14 are positioned within a master tray 12 with so that spaces or vacancies 15 remain between some of the sub-trays 14. In an arrangement of this type, the spaces 15 may simply be left empty, or items may be stored in the spaces 15 while other items may be stored within the sub-trays 14. For one example, food products may be held within the sub-trays 14 while napkins and utensils may be stored within a space 15 between sub-trays 14.

As is shown best in FIG. 3, the sub-trays 14 may optionally be provided with a recessed area 50 in each of their outside bottom surfaces, and the bottom interior surface 52 of the master tray 12 may be provided with at least one corresponding raised surface or protuberance 54. In this way, the recessed area 50 of a sub-tray 14 can nest or fit onto a raised surface 54 to "lock" or hold the sub-tray 14 in place relative to the other sub-trays 14 and/or the interior portion of the master tray 12. The gap or space shown between the recessed area 50 and protuberance 54 is for illustration purposes, where the actual space between the surfaces may be larger or may be essentially eliminated, as when the surfaces actually touch each other for a frictional fit. Preferably, multiple raised surfaces 54 are provided across the bottom surface 52 of the master tray 12 to accommodate multiple sub-trays 14 for securing such sub-trays in place. It is further preferred that when such multiple raised areas are provided, they are designed in such a way that sub-trays 14 of various sizes can fit onto the raised surfaces 54. This may be accomplished in a variety of ways. For one example, a master tray 12 may be provided with an array of raised surfaces 54 that are spaced from one another in a pattern that can accommodate sub-trays 14 that have one or more recessed areas that can fit over one or more of the raised surfaces 54. Referring again to FIG. 12, for example, a sub-tray 56 may have a recessed area that fits onto a single raised surface, while a sub-tray 58 (which is approximately twice as wide as the sub-tray 56) can have one recessed area that is large enough to fit over two raised surfaces, or may have a two recessed areas to slide or fit over two adjacent raised surfaces.

While the recessed areas 50 and corresponding raised surfaces 54 are illustrated in FIG. 3 as being relatively square or rectangular in shape, it is understood that any mating shapes can be used for these features, such as rectangular, circular, elliptical, triangular, or the like. It is further understood that recessed areas may instead be recessed into the bottom of the master tray and that the bottom surface of the sub-trays may then include corresponding protuberances. Further, the master trays and sub-trays may instead include other types of features for holding the sub-trays in place relative to a master tray in which it is positioned, such as sub-trays with interlocking side walls or other securing features, for example. It is also understood that no such positioning features necessarily need to be provided.

Figure 4:
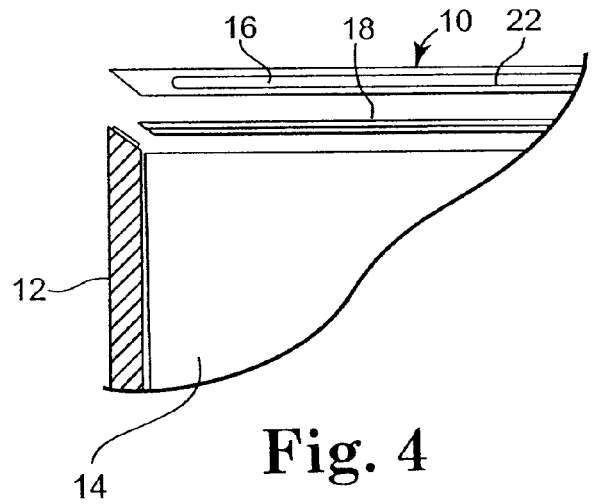
FIG. 4 is an enlarged detail of the view of FIG. 3, showing a cut-away of a hollow interior of the overall lid containing a freezable gel.

FIG. 3 is a cross-sectional view of a master tray 12 showing the interior portion of the tray with two sub-trays 14 adjacent to one another. As discussed above, a small gap 13 may optionally be provided between sub-trays 14 for easier removal and insertion of sub-trays 14. As seen in FIGS. 3 and 4, individual lids 18 may optionally be provided for the sub-trays 14, in addition to an overall lid 16 that is large enough to cover the entire master tray 12. In particular, FIGS. 3 and 4 each show a lid 16 suspended in position to lower into sealing arrangement with a master tray 12 and two different arrays of sub-trays 14. More particularly, each of these figures illustrates an interior lid 18 for a sub-tray 14 of the left side of the corresponding master tray 12. Any of the individual lids 18 and/or the overall lid 16 may have beveled edges 24 that preferably mate with corresponding beveled edges 25 on the top surface of the sides of the master tray 12 and/or corresponding beveled edges on the top surface of the sides of the individual sub-trays 14. In this way, each lid 16, 18 is capable of being partially or entirely positioned within the interior of its respective master tray 12 or sub-tray 14. In other words, each lid 16, 18 may optionally be insertable within either a sub-tray 14 or master tray 12 so that the top surface of the lid is flush with the sides of the corresponding sub-tray or master tray. The master tray 12 and sub-trays 14 may each have individual sealing lids 16, 18 that snap-fit into place, or otherwise fasten onto the top of the master tray 12 or the tops of the individual sub-trays 14, respectively, as seen in FIGS. 3 through 5, 8 and 9. Individual sealing lids 18 for each sub-tray 14, as in FIGS. 3 and 4, keep the ingredients fresh and safe from excessive dehydration during storage and before use, such as in the refrigerator.

Preferably, as seen for example in FIG. 5, the lid 16 of the master tray 12 is provided with a pattern or grid of sealing surfaces 28 sized to the openings of the array of sub-trays 14 nested within the master tray 12. In such an embodiment, the outer perimeter of the lid 16 seals the outer perimeter of the master tray 12 while the sealing surfaces 28 simultaneously contact and seal the outer perimeter of each of the individual sub-trays 14 positioned within the master tray 12. FIG. 5 shows a lid 16 with an array of sealing surfaces 28 to interfit with the rims of both the master tray 12 and the sub-trays 14. The sealing surfaces 28 are preferably arranged to have the capability of sealing any sub-tray 14 that may be contained within the corresponding master tray. In this particular example, sealing surfaces 28 of the lid 16 arranged to that they may interfit with or seal up to a maximum of twenty sub-trays 14. However, these sealing surfaces 28 are also arranged for sealing sub-trays that are sized to be multiples of each grid square 29, where the larger sub-trays will contact only some of the sealing surfaces 28 of adjacent plural grid squares 29. For example, in the embodiment shown in FIG. 5, the sealing surfaces 28 within the lid 16 will contact the rims of the nine sub-trays 14, so there will be some sealing surfaces 28 that will not be in contact with a surface of a sub-tray 14.

The master tray 12 and sub-trays 14 may be made of synthetic resin, with a smooth interior and rounded corners to facilitate easy cleaning, and a sanded or pebbled exterior to facilitate secure, non-slip gripping. In addition, the interior of the lid 16 of the master tray 12 or the opening of each contained sub-tray 14 may be formed with a soft synthetic resin or other material that allows corresponding areas of the lid 16 of the master tray 12 and sub-tray 14 openings fit and seal together smoothly. The sub-trays 14 may be made of thin synthetic resin material for disposal after use, if desired, or may alternatively be made of a more durable material for sub-tray reuse, if desired. The material from which the planar surface of the lid 16 is made may be relatively transparent to allow viewing of the contents of the sub-trays 14, or may instead be relatively opaque, as desired. In one preferred embodiment, the sealing surfaces 28 are made of a relatively soft durometer material (e.g., 30-40), and may further be a closed cell material that is preferably relatively stain resistant. In addition, all materials of the tray system 10 are preferably approved by the FDA as "food safe" or "food grade" materials.

The seal between the sealing surfaces 28 and the top peripheral edges of the sub-trays 14 may be established mainly through pressure between these surfaces, which causes at least slight deformation of the sealing surface material so that it conforms to the top surface of the sub-trays 14. Alternatively, the sealing surfaces 28 may be provided more in the form of a "channel" that can be deformed at least slightly to accept the top edge of corresponding sub-trays 14 to thereby seal the two surfaces to each other. In another alternative, the top peripheral edges of the sub-trays 14 may be provided with a relatively soft, deformable material to seal against a lid, where such a lid could also include corresponding sealing surfaces, or may be a relatively flat surface against which the soft edges of the sub-trays can press for sealing. In yet another alternative, the lid may have recessed areas into which the sub-tray edges can be pressed to seal the interior portion of the sub-trays from the interior of the master tray in which it is inserted.

Predetermined gaps 31 along the length of the sealing surfaces 28 may optionally be provided to allow airflow needed to maintain the quality of certain ingredients. Minute air perforations around the surfaces of either the sub-trays 14 or the master tray 12 may also optionally be provided to allow for additional airflow. Oxygen-absorbents within the master tray 12 may also be provided to retard spoilage of oxygen-sensitive ingredients.

Figure 2:
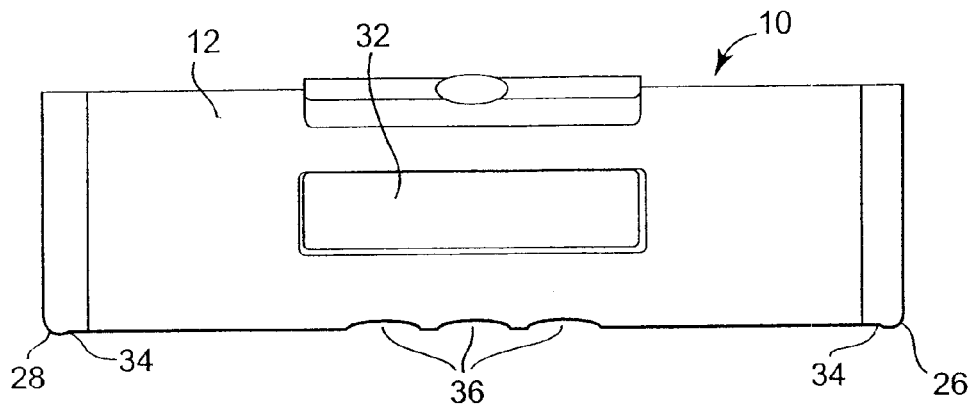
FIG. 2 is a front-end view of the exterior of a master tray, showing a latch for retaining the lid and a label.
Figure 11:
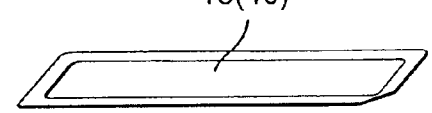
FIG. 11 is a perspective view of a several individual sub-trays as they can nest within one another, along with a corresponding lid.
Figure 11:
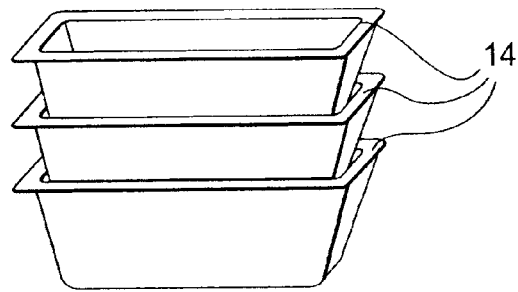

FIG. 11 shows a nesting of identical sub-trays 14, which may be disposable, with a suspended lid 18. As shown in FIG. 2, the leading edge of the master tray 12 may have molded indents 36 to facilitate grasping.

Figure 7:
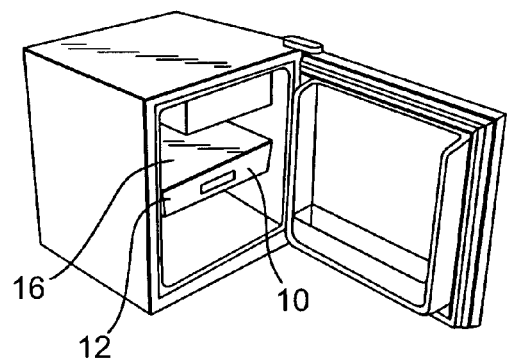
FIG. 7 is a perspective view of a compartmentalized storage system of the present invention inside a refrigerator.

A particular master tray 12 can be sized to fit into a portable cooler, or into a smaller refrigerator, such as the type commonly found in a family room, hotel room, dormitory or the like, as seen in FIG. 7. Optionally, as seen in FIG. 7, the compartmentalized tray system 10 can hang from a refrigerator shelf in order to keep the area beneath the tray system 10 free for storing other refrigerator items. In this way, other items would preferably not need to be moved before the user can remove the tray system 10 from the refrigerator. The dimensions for the master tray 12 should allow easy insertion and withdrawal of the master tray 12 relative to the dimensions and door opening mechanism of a standard sized refrigerator. The illustrative dimensions for a master tray discussed above of 12 inches (30.48 cm) by 15 inches (38.10 cm) are suitable for most standard sized home refrigerators. The width of the tray is preferably somewhat smaller than a standard refrigerator, thus allowing easy insertion and withdrawal of the tray system 10 so that the refrigerator door does not provide an obstacle. A refrigerator may have a specifically manufactured shelf for the master tray 12, making the entire compartmentalized tray system 10 space-efficient within the refrigerator and easy to remove and use.

Figure 6:
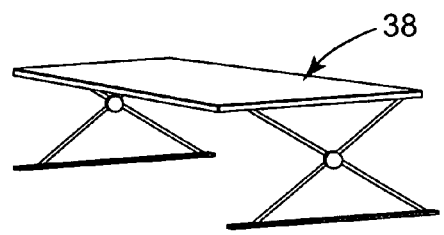
FIG. 6 is a perspective view of a support to elevate a master tray above another surface.

As shown in FIG. 6, an optional support 38, which could be adjustable, may be provided to elevate the master tray 12 (FIG. 1) above a refrigerator shelf, or any other type of support member can instead be used that can position the tray system 10 (FIG. 1.) within a refrigerator or other storage area in a desirable location. In this example, bottles or other containers can easily fit beneath the support 38, thereby providing for better utilization of vertical refrigerator space. Further, as is seen in FIGS. 2 and 3, the exterior bottom corners 26 of the master tray 12 may have gliders 34, for example, for easy insertion and removal of master tray 12 from a refrigerator shelf. Other types of gliders, rollers, or other features that facilitate easier insertion and removal of the master tray from a shelf or other storage area may be used in place of such gliders or in addition to such gliders, as desired.

Alternatively, an attachment system may optionally be used to suspend and fasten the master tray 12 relative to a shelf, such as a refrigerator shelf. Such an attachment system can be an integral part of the exterior surface of a lid 16 of a master tray 12 or may be an attachable and detachable feature. The attachment system should accommodate various potential locations of the master tray 12, such as for various refrigerator shelf designs. For instance, some refrigerator shelves may be thin synthetic resin or glass planar sheets, other shelves may have a narrow depending front skirt, and other shelves may be a grid of parallel rods with connecting rods generally at right angles to the parallel rods.

In one example, an attachment system can include a pair of opposing members, such as top and bottom arms, and a plurality of such attachments may be about the perimeter of the lid of a master tray. Each top arm can generally narrow from a proximal to distal end to allow easy insertion of the master tray 12 between bottles or containers on the shelf from which the master tray 12 suspends. Each bottom arm can fasten to the lid 16 of the master tray 12 and may have a connection, which may be ratchetable or otherwise moveable, to its respective top arm to allow changing the space between the arms after the master tray 12 has been suspended from the refrigerator shelf. Alternatively, the attachment may have a ratcheting mechanism to adjust the space between the two arms, or each arm can be manipulated independently of the other. In another embodiment, the distal end of the bottom arm facing the shelf may have resilient suction cups to assure stability and positioning of the master tray 12. When removed from the refrigerator, the bottom and top arms may collapse onto each other as opposing rails or legs to support the inverted lid 16.

The tray system 10 may optionally be designed so that as the master tray 12 slides forward from its refrigerator shelf space, the lid 16 tilts and lifts. In such an embodiment, the lid 16 may remain in place in the refrigerator until removed for cleaning or for use of the covered master tray 12 outside of the refrigerator.

Figure 9:
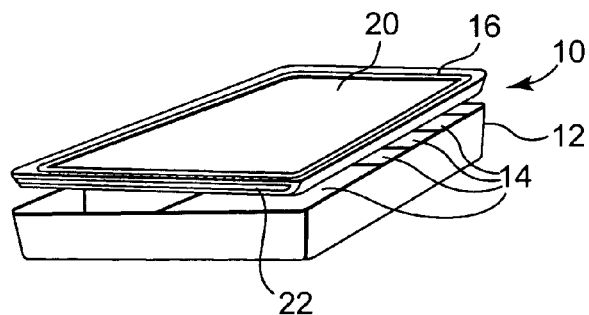
FIG. 9 is a perspective view of a master tray with an array of sub-trays and a lid with a cutting board surface in position for lowering into sealing engagement with both the master tray and the individual sub-trays.
Figure 8:
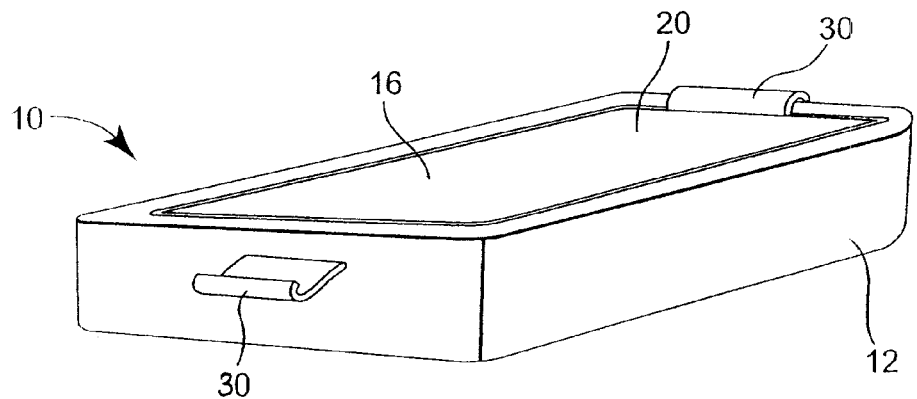
FIG. 8 is a perspective view of a covered master tray with hinged tabs for locking the lid onto the tray.

Either surface of the lid of the master tray 12 can have a cutting board surface 20, as shown in FIG. 8, for example. When the master tray 12 is opened, the lid 16 may sit on the attachment (described above for refrigerator storage), collapsed as parallel rails supporting the cutting board 20. The cutting board 20 surface may contain food-compatible iontophoretic materials or bactericides to control bacterial growth. The cutting board 20 can be integral with or removable from the lid 16 of the master tray 12 (e.g., by snap-attachment). The tray lid 16 can be hollow to accommodate refreezable gel packs 22, as seen in FIGS. 4 and 9, to maintain freshness of the packaged ingredients, when the storage system 10 is used to transport and serve contents without refrigeration, as a lunch or picnic salad/sandwich bar. When the lid 16 has a cutting board 20 surface, the refreezable gel packs 22 may be inserted into the lid 16 from a side opening. The refreezable gel packs 22 can be inserted while the cutting board 20 is removed from the master tray 12 and the removable cutting board 20 can seal the hollow lid 16. The refreezable gel pack 22 may be permanently sealed within the lid 16, so that the lid 16 can be frozen to transport perishable items without refrigeration. Alternatively, the gel pack 22 may instead be a material that can retain heat for keeping the contents of the master tray relatively warm.

The sub-trays 14 can be of thin synthetic resin film, available in quantity, nested by size for storage, distribution and disposal, as seen in FIG. 11. The synthetic resin film sub-trays 14 may have ethylene-absorbent or antibacterial material to retard food spoilage and bacterial growth. The sub-trays 14, as in FIGS. 10 and 11, can have a covering sheath 40 (in place of the lid 18) attached to the sub-tray 14 main body. The covering sheath 40 may have a linear bead along the remainder of its periphery to engage a mating depression near the mating inner sides of the free rim of the sub-tray 14. Each sub-tray 14 may alternatively have a wedge-fit lid 18, as in FIGS. 3, 4 and 9, that does not protrude outside the sub-tray 14 rim and is essentially flush with the sub-tray 14 rim. A wedge-fit lid 18 allows snug fitting of the sub-trays 14 within the master tray 12, optimizing utilization of the master tray 12 and avoiding debris accumulation between the sub-trays 14.

Figure 10:
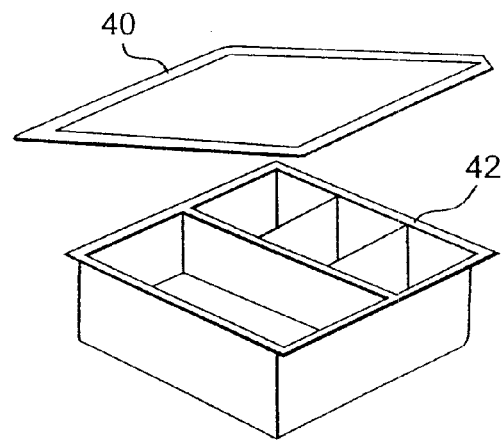
FIG. 10 is a perspective view of a one-piece construction of sub-trays with a suspended lid.

Although the compartmentalized storage system 10 of this invention is particularly suitable for home usage, a segmented tray 42, optionally disposable, as seen in FIG. 10, can also be used in conjunction with restaurant or supermarket salad/sandwich bars. Such a segmented tray 42 can typically be molded from a single sheet of material, if desired. For example, a synthetic resin sheet may be deformed to provide independent sections as an array of segmented trays 42, seen in FIG. 10. A linear depression may be along the top rim of each segmented tray 42. For sub-trays 14 adjacent to the master tray 12 outer rim, this linear depression may be along the outer rim of the segmented tray 42. A lid 16 or covering sheath 40 for the segmented tray 42 may have a linear bead of the same dimensions as the top rims of the sub-trays 14. When pressed onto the segmented tray 42, the lid 16 or covering sheath 40 can mate with the top rim depressions to seal each individual sub-tray 14 and the entire segmented tray 42 array. In this prepackaged form, the sandwich/salad ingredients may be easily transported from the supermarket to the sandwich/salad master tray 12 in the consumer's refrigerator, eliminating possible cross contamination of ingredients in adjacent sub-trays 14. In some embodiments, such a disposable, segmented tray 42 would be a tray within a tray, replacing the individual sub-trays 14. In other embodiments, such a segmented tray 42 could be an independent sandwich/salad bar ingredients container. As mentioned above, this disposable, segmented tray 42 can be made to include food preservatives, such as antibacterial agents and ethylene absorbent agents. As a structural and functional equivalent for individual sub-trays 14, disposable sub-trays 14 or segmented trays 42 may each have covering sheath 40 as a replacement for the lid 18 for each individual sub-tray 14.

In accordance with the present invention, the arrangement of sealing surfaces 28 on a lid 16 are shown in the figures as a rectangular or square grid pattern, but the arrangement of sealing surfaces may include other shapes, such as circular, triangular and the like, with the understanding that better nesting of the sub-trays with each other across the length and width of the master tray will better utilize the interior space of the master tray for holding items within the sub-trays being held therein.

Other features may be provided to the compartmentalized storage system 10 to meet the needs of specific users or specific situations. For example, as seen in FIG. 8, the lid 16 may be lockable to the master tray 12. Hinged tabs 30 on the sides of the master tray 12 can pivot upward to lock the lid 16 in position. Alternatively, the master tray 12 can be locked with a combination lock or a strap device with a lock to retain the lid 16. For special diets, federal nutritional fact guidelines or other meal planning, weights or exchange quantities can be imprinted on or molded into the master tray 12, sub-trays 14 or the lids 16, 18. To keep track of the number of servings or quantities used or to aid proper nutrition, a counter, such as an abacus type counter, can be provided and attached to a portion of the tray system 10. The counter may be on a handle, a surface of the master tray 12, the sub-trays 14, the lids 16, 18 or a molded tab, for example. Such molded tabs can be of the type that appear on beverage cup lids, which can be depressed when a portion is used, and then later returned to its original shape. A dedicated space can optionally be provided on the tray system 10 for food preparation utensils, such as a grater, tongs, knife, or the like, or for a refillable pack of antibacterial wipes, for example.

As shown in FIG. 2, a slot 32 in a surface of the master tray 12 or sub-tray 14 may hold an insert, such as a metal insert to retain magnet reminders, a pad of self-adhesive notes, or a rewritable surface. The slot 32 may also retain a patient label, as in a compartmentalized pill box, for home bound or assisted living patients, to track when container refills are necessary, or to retain a freshness expiration date.

Although one use for the compartmentalized tray system 10 of this invention is for storage and transport of various food ingredients, a variety of other uses are equally intended to be within the scope of this invention. For one example, the tray system 10 may be used for storage and transport of live bait and/or similar fishing needs that should be stored separately but are desirably transported together. For another example, medicines and other health and beauty aids may be stored advantageously in this storage system 10. This storage system 10 may also stock collections of miniature electrical components, such as surface mount resistors ("SMRs") and surface mount capacitors ("SMCs"), readily available for use.

The present invention has now been described with reference to several embodiments thereof. The entire disclosure of any patent or patent application identified herein is hereby incorporated by reference. The foregoing detailed description and examples have been given for clarity of understanding only. No unnecessary limitations are to be understood therefrom. It will be apparent to those skilled in the art that many changes can be made in the embodiments described without departing from the scope of the invention. For example, the dimensions of the individual sub-trays, segmented trays, master trays and various lids and the overall dimensions of the storage system may be varied. Thus, the scope of the present invention should not be limited to the structures described herein, but only by the structures described by the language of the claims and the equivalents of those structures.

The invention claimed is:

1. A divided container system comprising:
    a master tray having an interior portion and a peripheral top edge, the interior portion configured to receive a plurality of separate sub-trays;
    at least one insertable sub-tray positionable within a first area of the interior portion of the master tray, the sub-tray being sized to occupy less than the entire interior portion and being interchangeably positionable in other areas of the interior portion, the sub-tray including a peripheral top edge, an interior portion, and a bottom surface having a feature for holding the sub-tray in place relative to the master tray when the sub-tray is positioned in the master tray;
    the master tray further having a bottom surface adapted to mate with the feature of the sub-trays;
    the sub-tray having a sub-tray lid insertable within the interior portion of the sub-tray;
    a master lid separate from the sub-tray lid and configured to sealably engage both the master tray and the sub-tray at least when the sub-tray lid is on the sub-tray, the master lid having an upper surface, a lower surface arrangeable to abut with the peripheral top edge of the sub-tray positioned in the master tray to thereby seal the interior portion of such sub-tray from the interior portion of the master tray; and a peripheral sealing surface for sealable contact with the peripheral top edge of the master tray.

2. The container system of claim 1, wherein the lower surface of the master lid abutting the peripheral top edge of the sub-tray comprises a grid.

3. The container system of claim 1, in which at least one of the master lid and the sub-tray further comprises a compliant material for conforming to the top peripheral edge of the sub-tray, and further in which the compliant material is between the lower surface of the master lid and the peripheral top edge of the sub-tray.

4. The container system of claim 1, wherein the at least one sub-tray comprises a plurality of sub-trays, the master lid being arrangeable to abut with and seal the peripheral edge of each of the plurality of sub-trays.

5. The container system of claim 4, wherein each of the plurality of sub-trays is identical to each of the other sub-trays.

6. The container system of claim 4, wherein at least one of the plurality of sub-trays has a different shape from at least one other of the plurality of sub-trays.

7. The container system of claim 4, in which the bottom surface of the master tray is adapted to mate with each of the features of the bottom surfaces of the plurality of sub-trays.

8. The container system of claim 1, wherein at least one of the upper and lower surfaces of the master lid comprises a cutting surface.

9. The container system of claim 1, wherein the sub-tray is rearrangeable within the interior portion of the master tray.

10. The container system of claim 1, wherein the sub-tray is detachably connected to the interior portion of the master tray.

11. The container system of claim 1, wherein the sub-tray is at least partially filled with a product.

12. The container system of claim 11, wherein the product in the sub-tray is a food product.

13. The container system of claim 1, wherein the sub-tray is removable and replaceable.

14. The container system of claim 1, further comprising a means to retain an insert in a surface of at least one of the master trays or the sub-tray.

15. The container system of claim 1, wherein the master lid further comprises a temperature-controlling means for regulating the temperature of the interior portion of the master tray.

16. The container system of claim 1, wherein the sub-tray is permanently attached to the interior portion of the master tray.

17. The container system of claim 1, in which the sub-tray is insertable into the interior portion of the master tray.

18. The container system of claim 1, in which the feature for holding the sub-tray in place relative to the master tray is recessed into the bottom surface of the sub-tray.

19. The container system of claim 1, in which the feature for holding the sub-tray in place relative to the master tray protrudes from the bottom surface of the sub-tray.

20. The container system of claim 1, in which the bottom surface of the master tray comprises a feature recessed into the bottom of the master tray and provided to mate with the feature of the bottom surface of the sub-tray.

21. The container system of claim 1, in which the bottom surface of the master tray comprises a feature protruding from the bottom of the master tray and provided to mate with the feature of the bottom surface of the sub-tray.

22. The container system of claim 1, in which the feature for holding the sub-tray in place relative to the master tray has a shape that is one of square, rectangular, circular, elliptical, and triangular.

23. The container system of claim 1, in which a portion of the bottom surface of the master tray adapted to mate with the feature of the bottom surface of the sub-tray has a shape that is one of square, rectangular, circular, elliptical, and triangular.

24. The container system of claim 1, in which at least one sub-tray further comprises a sub-tray lid that does not protrude above the peripheral top edge of the sub-tray.

* * * * *